(12) United States Patent
Pak et al.

(10) Patent No.: US 9,507,452 B2
(45) Date of Patent: *Nov. 29, 2016

(54) DISPLAY DEVICE AND METHOD OF DRIVING THE SAME

(71) Applicant: SAMSUNG DISPLAY CO., LTD., Yongin, Gyeonggi-Do (KR)

(72) Inventors: Sang-Jin Pak, Yongin-Si (KR); Man-Seung Cho, Seoul (KR); Kee-Han Uh, Yongin-Si (KR); Joo-Hyung Lee, Gwacheon-Si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/506,055

(22) Filed: Oct. 3, 2014

(65) Prior Publication Data

US 2015/0022477 A1    Jan. 22, 2015

Related U.S. Application Data

(62) Division of application No. 11/760,815, filed on Jun. 11, 2007, now Pat. No. 8,866,751.

(30) Foreign Application Priority Data

Jun. 9, 2006 (KR) .................. 10-2006-0051740

(51) Int. Cl.
*G06F 3/041* (2006.01)
*G06F 3/044* (2006.01)
*G09G 3/36* (2006.01)

(52) U.S. Cl.
CPC ............. *G06F 3/0412* (2013.01); *G06F 3/044* (2013.01); *G09G 3/3648* (2013.01); *G09G 2310/061* (2013.01)

(58) Field of Classification Search
CPC .. G06F 3/0362; G06F 3/03547; G06F 3/044; H04H 60/04; H04H 60/05
See application file for complete search history.

(56) References Cited

U.S. PATENT DOCUMENTS 3,749,970 A     7/1973 Schmersal
3,775,560 A *  11/1973 Ebeling ................. G06F 3/0421
                                                                 178/18.09

(Continued)

FOREIGN PATENT DOCUMENTS

JP        02-188718      7/1990
JP        04-045481      2/1992

(Continued)

OTHER PUBLICATIONS

English Abstract for Publication No. 2006-510092.

(Continued)

*Primary Examiner* — Patrick F Marinelli
(74) *Attorney, Agent, or Firm* — F. Chau & Associates, LLC

(57) ABSTRACT

A display device includes a display panel, a source driving part, a gate driving part, a readout part and a pulse generating part. The display panel includes an array substrate on which a source line and a gate line are formed, and an opposite substrate on which a common electrode is formed. The readout part is electrically connected with at least one of the lines of the array substrate and the common electrode of the opposite substrate, and reads out a detection signal during an elimination period of a frame period. The pulse generating part outputs a control pulse for driving the readout part during the elimination period. Accordingly, a detection signal is read out through lines or a common electrode that are/is formed for displaying an image, so that an aperture ratio may be increased, and a manufacturing process thereof may be simplified.

7 Claims, 14 Drawing Sheets

(56) References Cited

U.S. PATENT DOCUMENTS

| | | | | |
|---|---|---|---|---|
| 4,295,720 A * | 10/1981 | Mizokami | G03B 7/083 | 396/252 |
| 5,296,847 A * | 3/1994 | Takeda | G09G 3/3648 | 345/208 |
| 5,392,058 A | 2/1995 | Tagawa | | |
| 5,402,141 A * | 3/1995 | Haim | G09G 3/3607 | 345/88 |
| 5,410,329 A * | 4/1995 | Tagawa | G06F 3/0412 | 345/104 |
| 5,436,635 A * | 7/1995 | Takahara | G09G 3/3648 | 345/90 |
| 5,581,274 A * | 12/1996 | Tagawa | G06F 3/0412 | 178/20.01 |
| 5,774,099 A * | 6/1998 | Iwasaki | G09G 3/3655 | 345/87 |
| 5,923,310 A * | 7/1999 | Kim | G09G 3/3648 | 345/90 |
| 5,945,970 A * | 8/1999 | Moon | G09G 3/3648 | 345/211 |
| 6,239,788 B1 | 5/2001 | Nohno et al. | | |
| 6,243,069 B1 * | 6/2001 | Ogawa | G02F 1/1368 | 345/102 |
| 6,323,846 B1 | 11/2001 | Westerman et al. | | |
| 6,396,485 B1 * | 5/2002 | Minami | G09G 3/3622 | 345/100 |
| 6,642,916 B1 * | 11/2003 | Kodama | G09G 3/3688 | 345/100 |
| 7,280,167 B2 | 10/2007 | Choi et al. | | |
| 7,379,054 B2 | 5/2008 | Lee | | |
| 7,499,114 B2 * | 3/2009 | Choi | G06F 3/0412 | 345/173 |
| 7,825,832 B2 * | 11/2010 | Nishimura | G06F 3/03547 | 341/5 |
| 2002/0063703 A1 * | 5/2002 | Furuhashi | G09G 3/3655 | 345/212 |
| 2004/0008177 A1 | 1/2004 | Ahn | | |
| 2004/0041152 A1 | 3/2004 | Eguchi | | |
| 2004/0178434 A1 * | 9/2004 | Kato | G02F 1/136213 | 257/298 |
| 2004/0189585 A1 | 9/2004 | Moon | | |
| 2004/0189587 A1 * | 9/2004 | Jung | G02F 1/13338 | 345/102 |
| 2004/0207583 A1 * | 10/2004 | Koo | H01L 27/12 | 345/82 |
| 2004/0239650 A1 * | 12/2004 | Mackey | G06F 3/044 | 345/174 |
| 2005/0046622 A1 * | 3/2005 | Nakanishi | G06F 3/0488 | 345/173 |
| 2005/0093815 A1 * | 5/2005 | Jen | G09G 3/3406 | 345/102 |
| 2005/0130344 A1 * | 6/2005 | Kimura | H01L 21/6835 | 438/106 |
| 2005/0156856 A1 | 7/2005 | Jang et al. | | |
| 2005/0156861 A1 * | 7/2005 | Song | G09G 3/3677 | 345/100 |
| 2005/0176381 A1 * | 8/2005 | Ieki | G06K 19/0723 | 455/78 |
| 2005/0253829 A1 | 11/2005 | Mamba et al. | | |
| 2006/0012575 A1 * | 1/2006 | Knapp | G02F 1/13338 | 345/173 |
| 2006/0017710 A1 * | 1/2006 | Lee | G02F 1/13338 | 345/173 |
| 2006/0066604 A1 | 3/2006 | Yang | | |
| 2006/0119756 A1 * | 6/2006 | Shin | G02F 1/13624 | 349/38 |
| 2006/0146038 A1 * | 7/2006 | Park | G06F 3/0412 | 345/173 |
| 2006/0192739 A1 * | 8/2006 | Shin | G09G 3/3607 | 345/90 |
| 2006/0256093 A1 * | 11/2006 | Furukawa | G06F 3/0412 | 345/173 |
| 2006/0262099 A1 * | 11/2006 | Destura | G02F 1/13338 | 345/173 |
| 2006/0279511 A1 * | 12/2006 | Uh | G11C 19/28 | 345/100 |
| 2007/0030221 A1 * | 2/2007 | Pak | G02F 1/13338 | 345/87 |
| 2007/0030255 A1 * | 2/2007 | Pak | G06F 3/044 | 345/173 |
| 2007/0182719 A1 * | 8/2007 | Lee | G06F 3/047 | 345/173 |
| 2007/0195049 A1 * | 8/2007 | Choi | G09G 3/3655 | 345/98 |
| 2007/0216657 A1 | 9/2007 | Konicek | | |
| 2008/0018612 A1 * | 1/2008 | Nakamura | G06F 3/0354 | 345/173 |
| 2008/0048994 A1 * | 2/2008 | Lee | G06F 3/0412 | 345/173 |
| 2008/0062140 A1 * | 3/2008 | Hotelling | G09G 3/3648 | 345/173 |
| 2008/0129898 A1 * | 6/2008 | Moon | G02F 1/13338 | 349/12 |
| 2008/0224992 A1 * | 9/2008 | Kim | G09G 3/2003 | 345/107 |
| 2015/0022477 A1 * | 1/2015 | Park | G06F 3/0412 | 345/173 |

FOREIGN PATENT DOCUMENTS

| | | |
|---|---|---|
| JP | 09-159995 | 6/1997 |
| JP | 11-008741 | 1/1999 |
| JP | 2000-221475 | 11/2000 |
| JP | 2003-344823 | 12/2003 |
| JP | 2004-054961 | 2/2004 |
| JP | 2005-165251 | 6/2005 |
| JP | 2005-293374 | 10/2005 |
| JP | 2005-327106 | 11/2005 |
| JP | 2006-510092 | 3/2006 |
| JP | 2006-091897 | 4/2006 |
| WO | 03100511 | 12/2003 |

OTHER PUBLICATIONS

English Abstract for Publication No. 2000-221475.
English Abstract for Publication No. 2003-344823.
English Abstract for Publication No. 02-188718.
English Abstract for Publication No. 04-045481.
English Abstract for Publication No. 11-008741.
English Abstract for Publication No. 2005-327106.
English Abstract for Publication No. 09-159995.
English Abstract for Publication No. 2004-054961.
English Abstract for Publication No. 2006-091897.
English Abstract for Publication No. 2005-165251.
English Abstract for Publication No. 2005-293374.

* cited by examiner

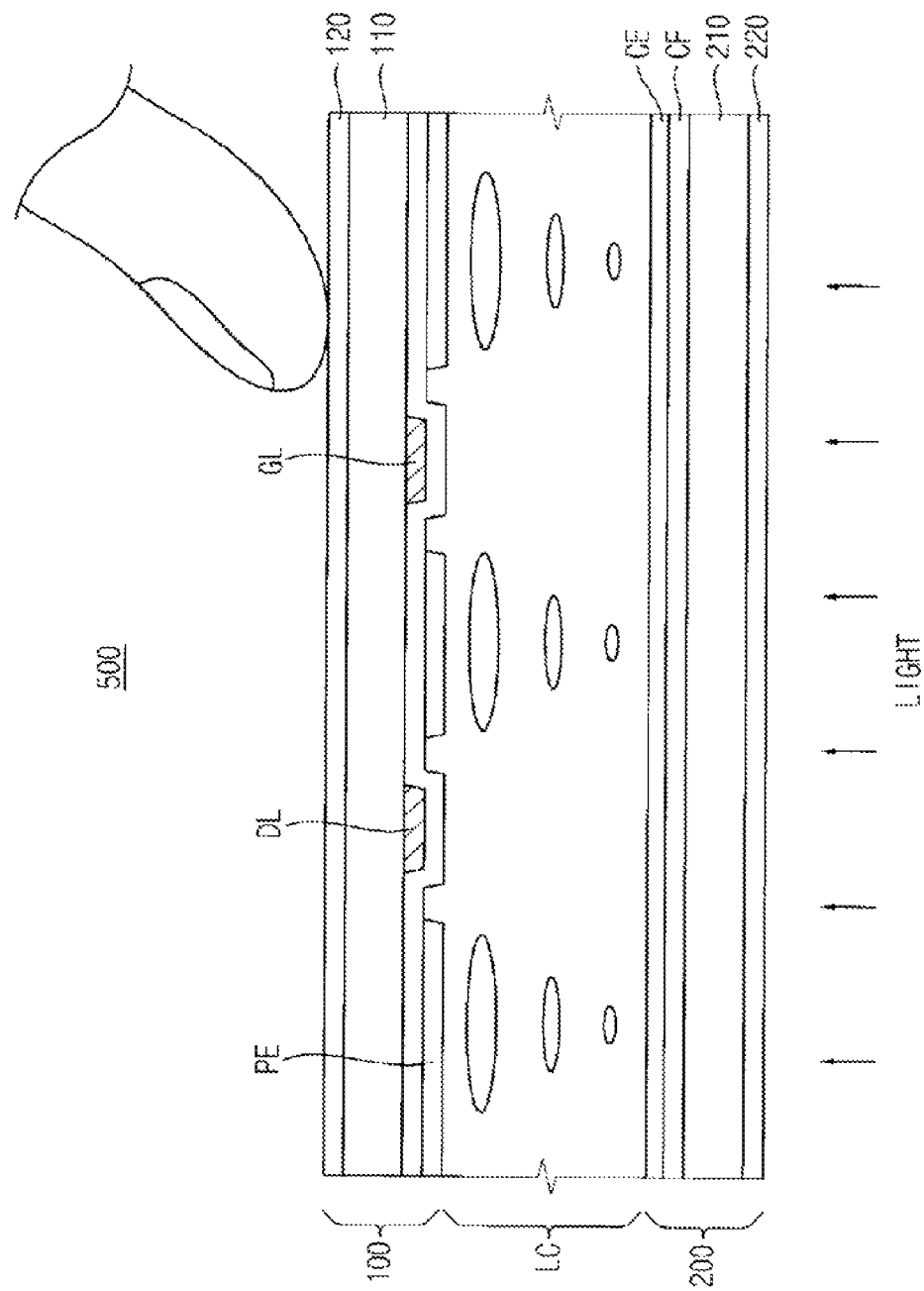

DISPLAY DEVICE AND METHOD OF DRIVING THE SAME

CROSS-REFERENCE TO RELATED APPLICATIONS

This application is a Divisional application of U.S. patent application Ser. No. 11/760,815 filed on Jun. 11, 2007 and claims priority to and the benefit of Korean Patent Application No. 10-2006-0051740 filed on Jun. 9, 2006, the entire contents of each of which are incorporated by reference herein.

BACKGROUND OF THE INVENTION

1. Technical Field

The present disclosure relates to a display device and a method of driving the display device. More particularly, the present disclosure relates to a display device having high transmissivity that is capable of simplifying a panel and a method of driving the display device.

2. Discussion of Related Art

Generally, a touch screen panel (TSP) is an input unit disposed on a display device for inputting data by touching it with fingers or other implements. Recently, an integrated type liquid crystal display (LCD) panel, which has a sensing device such as an optical sensor formed on the panel so as to display an image and detect a touch position, is being developed.

The integrated type LCD panel displays an image and detects a position at which an external object, that is, a finger or an implement, touches. The integrated type LCD panel includes an array substrate, a color filter substrate and a liquid crystal layer. The array substrate includes gate and source lines transmitting a driving signal for displaying an image. The array substrate further includes x-axis and y-axis readout lines transmitting a position signal for detecting a touch position. A change in an electrical characteristic generated when an object touches the panel is transmitted through the x-axis and y-axis readout lines, thereby detecting the touch position.

As mentioned above, the integrated type LCD panel needs to include the readout lines in addition to the gate and source lines for detecting a touch and, accordingly, disadvantageously deteriorates transmissivity compared to an LCD panel that does not have the readout lines and only displays images.

SUMMARY OF THE INVENTION

Exemplary embodiments of the present invention obviate the above problems and provide a display device having high transmissivity and that is capable of simplifying a display panel.

An exemplary embodiment of the present invention also provides a method of driving the display device.

In a display device, according to an exemplary embodiment of the present invention, the display includes a display panel, a source driving part, a gate driving part, a readout part and a pulse generating part to meet the above-mentioned requirement. The display panel includes an array substrate on which a source line and a gate line are formed, and an opposite substrate on which a common electrode is formed. The source driving part outputs a data signal to the source line during a display period of a frame period. The gate driving part outputs a gate signal to the gate line during the display period. The readout part is particularly connected with at least one of the lines of the array substrate and the common electrode of the opposite substrate, and reads out a detection signal during an elimination period of the frame period. The pulse generating part outputs a control pulse for driving the readout part during the elimination period of the frame period.

According to an exemplary embodiment of the present invention, in a method of driving a display device including an array substrate on which a source line and a gate line are formed and an opposite substrate on which a common electrode is formed, the method includes displaying an image at the display device by outputting a driving signal to the source and gate lines during a display period of a frame period and reading out a detection signal detected at the display device from at least one of the lines of the array substrate and the common electrode of the opposite substrate during an elimination period of the frame period.

In addition, according to the above-mentioned display device and the method of driving the display device, a detection signal is read out through lines or a common electrode that are formed for displaying an image, thereby displaying an image and detecting a touch without an additional line. As a result, the display quality of the display device may be improved, and processes thereof may be simplified.

BRIEF DESCRIPTION OF THE DRAWINGS

Exemplary embodiment of the present invention will be understood in more detail from the following descriptions taken in conjunction with the accompanying drawings, in which:

FIG. 7 is a cross-sectional view illustrating a display panel according to an exemplary embodiment of the present invention;

DESCRIPTION OF EXEMPLARY EMBODIMENTS

Figure 1:
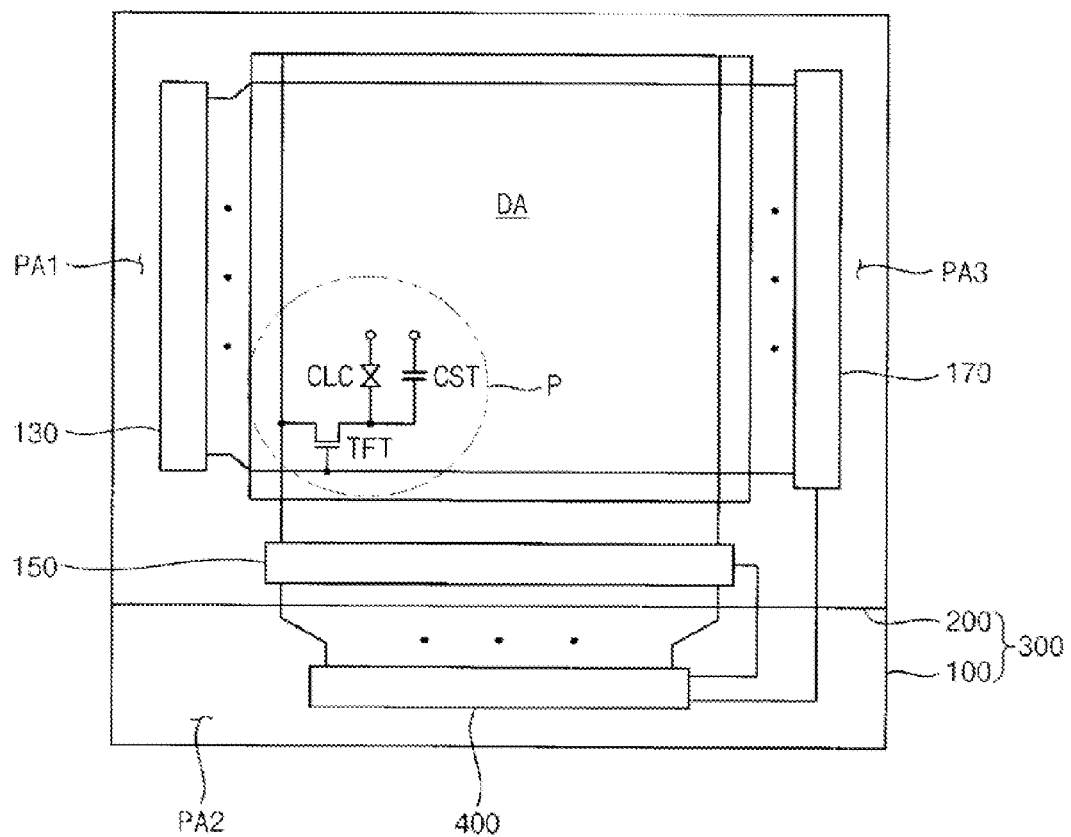
FIG. 1 is a plan view illustrating a display device according to an exemplary embodiment of the present invention.

The present invention will now be described more fully hereinafter with reference to the accompanying drawings, in which exemplary embodiments of the invention are shown. This invention may, however, be embodied in many different forms and should not be construed as limited to the exemplary embodiments set forth herein; rather, these exemplary embodiments are provided so that this disclosure will be thorough and complete, and will fully convey the scope of the invention to those skilled in the art. Like reference numerals refer to similar or identical elements throughout.

Hereinafter, exemplary embodiments of the present invention will be explained in detail with reference to the accompanying drawings.

FIG. 1 is a plan view illustrating a display device according to an exemplary embodiment of the present invention.

Referring to FIG. 1, the display device includes a display panel 300, a gate driving part 130, a first readout part 150, a second readout part 170 and a driving part 400.

Figure 4:
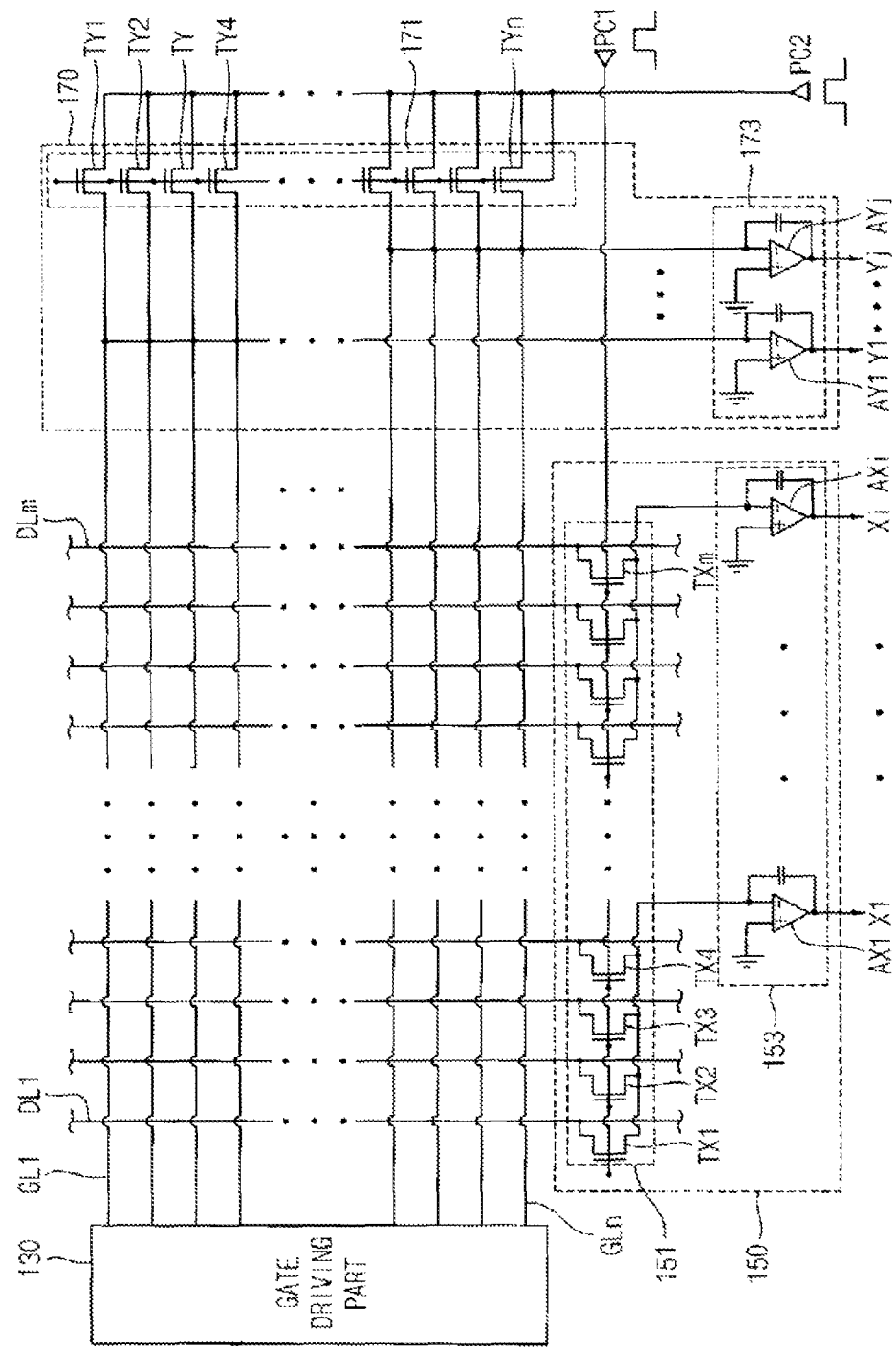
FIG. 4 is a circuit diagram of the first and second readout parts in FIG. 1.

The display panel 300 includes an array substrate 100, an opposite substrate 200 and a liquid crystal layer (not shown) interposed between the substrates 100 and 200. The array substrate 100 includes a display area DA for detecting a touch position and displaying an image, and first, second and third peripheral areas PA1, PA2 and PA3 surrounding the display area DA. The display area DA includes source lines DL1, DL2, . . . , DLm and gate lines GL1, GL2 . . . , GLn that intersect one another, as shown in FIG. 4. The source lines DL1, DL2, . . . , DLm and gate lines GL1, GL2, . . . , GLn define a plurality of pixel parts P. Each of the pixel parts P includes a switching element TFT and a pixel electrode (not shown), that is, a first electrode of a storage capacitor CST and a liquid crystal capacitor CLC.

The opposite substrate 200 is combined with the array substrate 100 to receive the liquid crystal layer. A common electrode (not shown), which is a second electrode of the liquid crystal capacitor CLC and is opposite to the pixel electrode, is formed on the opposite substrate 200.

The gate driving port 130 is formed in the first peripheral area PA1 of the array substrate 100. In addition, the gate driving part 130 successively outputs gate signals to the gate lines GL1, GL2, . . . , GLn.

Figure 5:
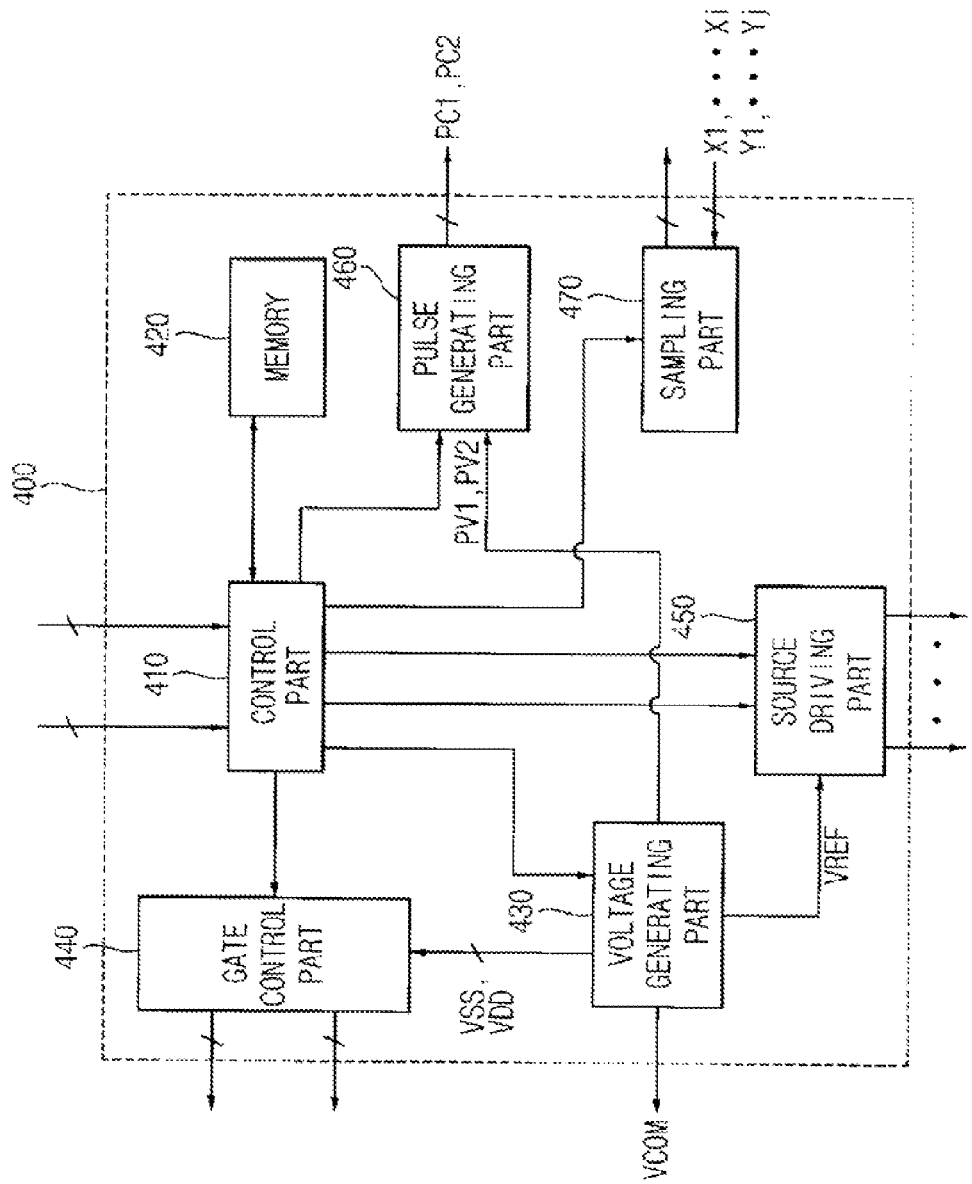
FIG. 5 is a block diagram of the driving part in FIG. 1.

The first readout part 150 is formed in the second peripheral area PA2 of the array substrate 100. The first readout part 150 reads out first detection signals X1, X2, . . . , Xi, as shown in FIG. 5. For example, the first readout part 150 reads out the first detection signals X1, X2, . . . Xi detected through the source lines DL1, DL2, . . . , DLm in response to a first control pulse.

The second readout part 170 is formed in the third peripheral area PA3 of the array substrate 100. The second readout part 170 reads out second detection signals Y1, Y2, . . . , Yj. For example, the second readout part 170 reads out the second detection signals Y1, Y2, . . . , Yj shown in FIG. 5 detected through the gate lines GL1, GL2, . . . , Gln in response to a second control pulse. Therefore, the first and second readout parts 150 and 170 may be integrated on the array substrate 100, or may be mounted as a separate chip.

The driving part 400 may be mounted in the second peripheral area PA2 of the array substrate 100, or may be integrated therein. When the driving part 400 is embodied as a chip, the driving part 400 may include the first and second readout parts 150 and 170.

The driving part 400 outputs a data signal for displaying an image to the source lines DL1, DL2, . . . , DLm during a display period DISPLAY of a frame period. Additionally, the driving part 400 outputs a gate control signal to the gate driving part 130 during the frame period, to control the gate driving part 130. Accordingly, the gate driving part 130 successively outputs the gate signals to the gate lines GL1, GL2, . . . , GLn.

The driving part 400 outputs the first and second control pulses to the first and second readout parts 150 and 170 during elimination periods FP and BP (see FIG. 6) of the frame period, respectively. The driving part 400 analyzes the first detection signals X1, X2, . . . , Xi and the second detection signals Y1, Y2, . . . , Yj that are read out from the first and second readout parts 150 and 170. Accordingly, the driving part 400 samples coordinates of positions touched by an object, such as a user's finger.

Figure 2:
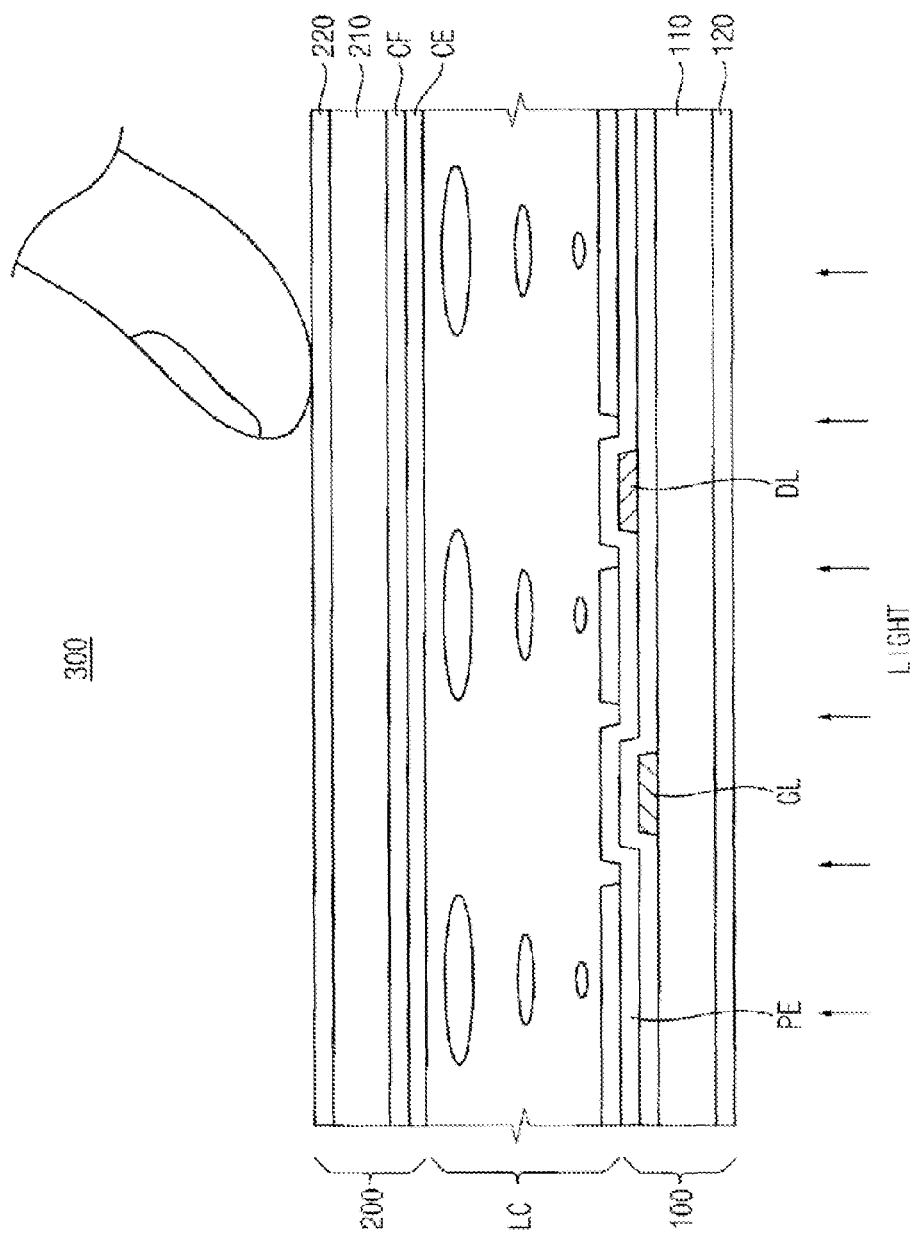
FIG. 2 is a cross-sectional view illustrating the display panel in FIG. 1.
Figure 3A:
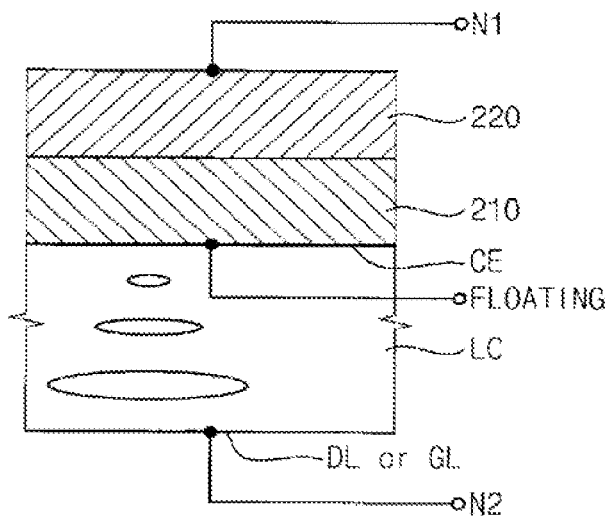
FIG. 3A is a schematic view illustrating the display panel in FIG. 2.
Figure 3B:
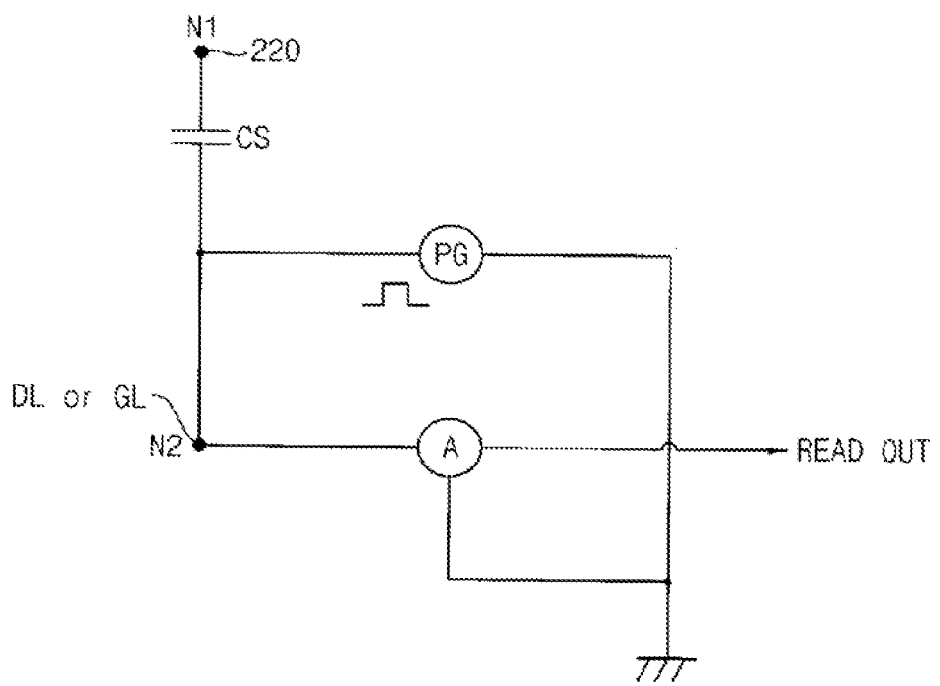
FIG. 3B is an equivalent circuit diagram of the display panel in FIG. 2.

FIG. 2 is a cross-sectional view illustrating the display panel in FIG. 1. FIG. 3A is a schematic view illustrating the display panel in FIG. 2, and FIG. 3B is an equivalent circuit diagram of the display panel in FIG. 2.

Referring to FIG. 2, the display panel 300 includes an array substrate 100, an opposite substrate 200 facing the array substrate 100, a liquid crystal layer LC, a first optical film 120 and a second optical film 220. The display panel 300 has a structure in which the array substrate 100 is disposed at a lower part and the opposite substrate 200 is disposed at an upper part thereof.

The array substrate 100 includes a first glass substrate 110 on which a source line DL, a gate line GL and a pixel electrode PE are formed. The opposite substrate 200 includes a second glass substrate 210 underneath which a color filter substrate CF and a common electrode CE are formed. The first optical film 120 is attached to the array substrate 100, and the second optical film 220 is attached to the opposite substrate 200.

Light is admitted through a rear surface of the array substrate 100 in the display panel 300. An upper surface of the opposite substrate 200 is intended to be touched by an external object, such as the user's finger. An equivalent circuit diagram of the display panel 300 is illustrated in FIGS. 3A and 3B.

Referring to FIGS. 3A and 3B, the equivalent circuit diagram of the display panel 300 includes a first node N1, a detecting element CS, a pulse generator PG, a second node N2 and a current detector 'A'. The first node N1 corresponds to an upper surface of the opposite substrate 200 where the second optical film 220 is attached to the second glass substrate 210. The upper surface of the opposite substrate 200 is intended to be touched by the external object. The second node N2 corresponds to a source line DL (or gate line) that reads out a detection signal. In this case, the common electrode CE of the opposite substrate 200 maintains an electrically floating state.

A first electrode of the detecting element CS is connected with the first node N1, and a second electrode of the detecting element CS is connected with the pulse generator PG and the current detector 'A'. The detecting element CS is defined by the opposite substrate 200, the liquid crystal layer LC and the source line DL (or gate line). The source line DL (or gate line) is electrically connected with the pulse generator PG and the current detector 'A', respectively.

The equivalent circuit of the display panel 300 operates as follows.

When an object does not touch the opposite substrate 200, that is, the voltage of the first node N1 is a first voltage V1, a first current I1 flows through the equivalent circuit by a pulse generated from the pulse generator PG and the first current I1 is applied to the current detector 'A'. On the other hand, when an object touches the opposite substrate 200, that is, the voltage of the first node N1 is a second voltage V2, a second current I2 flows through the equivalent circuit in response to a pulse generated from the pulse generator PG. Accordingly, a current I1-I2, which is a difference between the first and second currents I1 and I2, is applied to the current detector 'A'. Herein, the expression "I1-I2" represents the difference in current between the first and second currents I1 and I2. The current detector 'A' outputs a detection signal in response to the applied current.

FIG. 4 is a circuit diagram of the first and second readout parts shown in FIG. 1.

Referring to FIG. 4, the first readout part 150 includes a first switching part 151 and a first current detecting part 153. The second readout part 170 includes a second switching part 171 and a second current detecting part 173.

The first switching part 151 includes a plurality of first transistors TX1, TX2, ..., TXm that are electrically connected with the source lines DL1, DL2, ..., DLm. Each of the first transistors TX1 includes a gate electrode to which a first control pulse PC1 is applied, a source electrode connected to the source line DL1, and a drain electrode outputting a first detection current. When the first control pulse PC1 is applied to the first transistor TX1, the first transistor TX1 outputs a current flowing through the source line DL1 to the first current detecting part 153.

The first current detecting part 153 includes a plurality of first op-amps AX1, AX2, ..., AXi. Each of the first op-amps AX1 may be connected with each of a plurality of the first transistors TX1, respectively, or each of the first op-amps AX1 may be connected with a plurality of the first transistors TX1 as a whole. In this exemplary embodiment, the first op-amp AX1 is connected with four first transistors TX1, TX2, TX3 and TX4, and outputs the first detection current flowing through the four source lines DL1, DL2, DL3 and DL4 as a first detection signal X1.

Accordingly, the first current detecting part 153 outputs the first detection currents, which are outputted from the first switching part 151, as the first detection signals X1, X2, ..., Xi.

The second switching part 171 includes a plurality of second transistors TY1, TY2, ..., TYn that are electrically connected with the gate lines GL1, GL2, ..., GLn. Each of the second transistors TY1 includes a gate electrode to which a second control pulse PC2 is applied, a source electrode connected to the gate line GL1, and a drain electrode outputting a second detection current. When the second control pulse PC2 is applied to the second transistor TY1, the second transistor TY1 outputs a current to the second current detecting part 173 through the gate line GL1.

The second current detecting part 173 includes a plurality of second op-amps AY1, AY2, ..., AYj. Each of the second op-amps AY1 may be connected with a plurality of the second transistors TY1, or each of the second op-amps AY1 may be connected with each of the plurality of the second transistors TY1, respectively. Herein, each of the second op-amps AY1 is connected with four second transistors TY1, TY2, TY3 and TY4, and outputs the second detection current flowing through the four gate lines GL1, GL2, GL3 and GL4 as a second detection signal Y1.

Accordingly, the second current detecting part 173 outputs the second detection currents outputted from the second switching part 171 as the second detection signals Y1, Y2, ..., Yj.

FIG. 5 is a block diagram illustrating the driving part 400 shown in FIG. 1.

Referring to FIGS. 4 and 5, the driving part 400 includes a control part 410, a memory 420, a voltage generating part 430, a gate control part 440, a source driving part 450, a pulse generating part 460 and a sampling part 470.

The control part 410 controls the overall operation of the driving part 400.

The memory 420 stores a data signal inputted from an external device by a predetermined unit.

The voltage generating part 430 generates driving voltages by using an external power source (not shown). The driving voltages include a gate-on voltage VSS, a gate-off voltage VDD, reference gamma voltages VREF, a common voltage VCOM, a first pulse voltage PV1 and a second pulse voltage PV2. The gate-on and gate-off voltages VSS and VDD are provided to the gate control part 440. The reference gamma voltages VREF are provided to the source driving part 450. The common voltage VCOM is provided to the liquid crystal capacitor CLC and the storage capacitor CST of the display panel 300, shown in FIG. 1. The first and second pulse voltages PV1 and PV2 are provided to the pulse generating part 460.

The gate control part 440 outputs gate control signals provided from the control part 410 and the gate-on and gate-off voltages VSS and VDD to the gate driving part 130. The gate control signals include a vertical starting signal, a first clock signal and a second clock signal.

The source driving part 450 converts a digital data signal read out from the memory 420 through the control part 410 to an analog data signal on the basis of the reference gamma voltages VREF, and outputs the analog data signal to the source lines DL1, DL2, ..., DLm. The source driving part 450 outputs the data signal to the source lines DL1, DL2, ..., DLm during a display period DISPLAY of each of the frame periods, as shown in FIG. 6.

Figure 6:
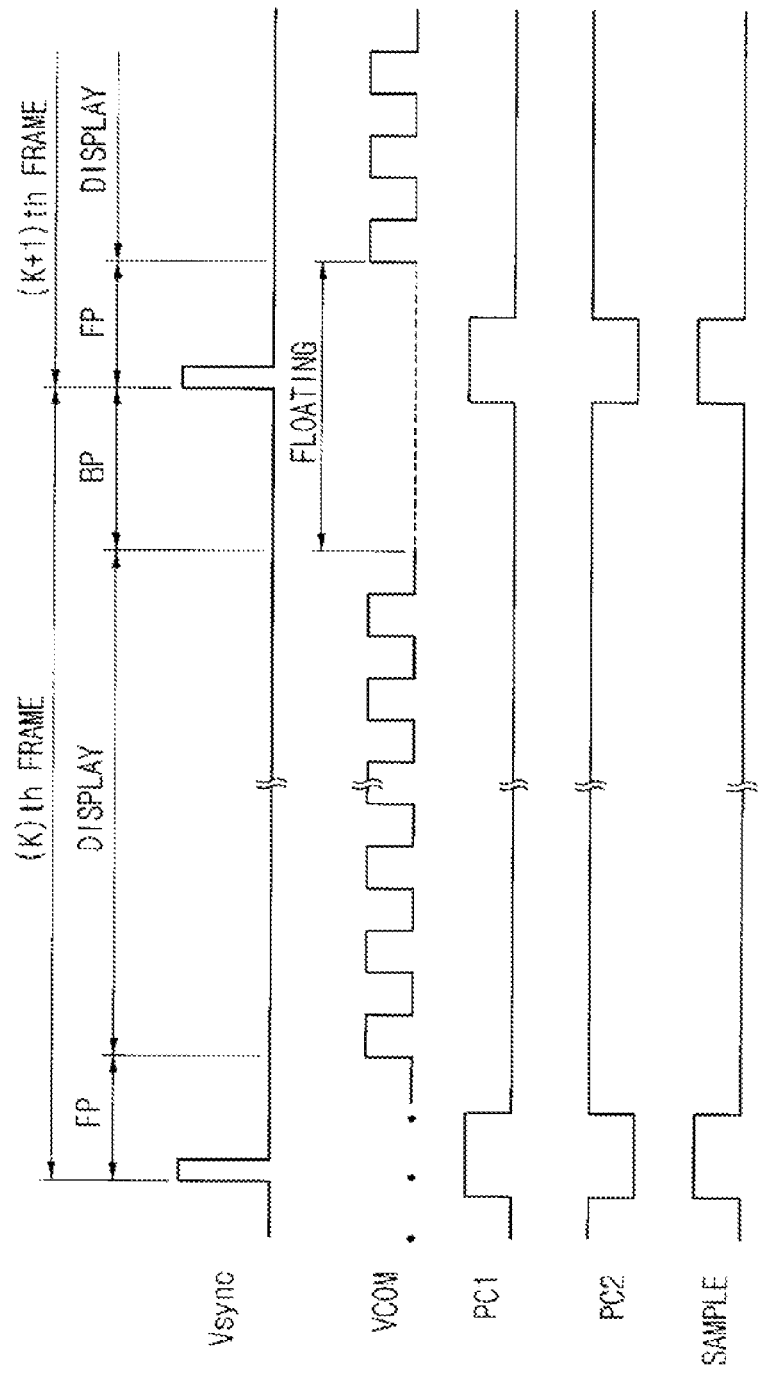
FIG. 6 is a timing diagram for explaining a method of driving the display panel in FIG. 1.

The pulse generating part 460 outputs the first and second control pulses PC1 and PC2 to the first and second readout parts 150 and 170 during elimination periods FP and BP of each of the frame periods, shown in FIG. 6. The first control pulse PC1 is a control signal for turning on the first transistors TX1, TX2, ..., TXm. The first control pulse PC1 has an electric potential substantially the same as that of the first pulse voltage PV1. The electric potential of the first pulse voltage PV1 may be set in various ranges, as long as the electric potential of the first pulse voltage PV1 is higher than that of a data signal charged in the liquid crystal capacitor CLC of the pixel part 'P' shown in FIG. 1. In other words, to output the first control pulse PC1 to the source lines DL1, DL2, ..., DLm during the elimination periods FP and BP, the electric potential of the first pulse voltage PV1, which has substantially the same electric potential as the first control pulse PC1, is higher than that of a data signal charged in the liquid crystal capacitor CLC of the pixel part 'P'. For example, the first pulse voltage PV1 may be higher than about 10 volts (V) because the electric potential of the data signal may be in a range of about 0V to about 10V.

The second control pulse PC2 is a control signal for turning on the second transistors TY1, TY2, ..., TYn. The second control pulse PC2 has an electric potential substantially the same as that of the second pulse voltage PV2. The electric potential of the second pulse voltage PV2 is set to be lower than that of the gate-off voltage VSS, because the electric potential of the second control pulse PC2, which is a signal applied to the gate lines GL1, GL2, ..., GLn during the elimination periods FP and BP, should be lower than that of the gate-off voltage VSS that turns off the switching element TFT of the pixel part 'P', to maintain the data signal charged in the liquid crystal capacitor CLC. According to the control of the control part 410, the sampling part 470 analyzes the first detection signals X1, X2, ..., Xi and the second detection signals Y1, Y2, ..., Yj, which are outputted from the first and second current detecting parts 153 and 173 of FIG. 4 during the elimination periods FP and BP, and samples coordinates of positions touched by an external object, such as a finger of the user.

FIG. 6 is a timing diagram for explaining a method of driving the display panel shown in FIG. 1.

Referring to FIGS. 4 to 6, the control part 410 controls the voltage generating part 430, the pulse generating part 460 and the sampling part 470, respectively on the basis of an externally supplied horizontal synchronization signal Vsync.

The control part 410 controls the voltage generating part 430, the pulse generating part 460 and the sampling part 470 corresponding to a display period DISPLAY and elimination periods FP and BP of a frame period FRAME, respectively. The frame period FRAME includes a front porch period FP, a display period DISPLAY and a hack porch period BP. An image is displayed in the display area DA (see FIG. 1) during the display period DISPLAY. On the other hand, the front porch period FP and the back porch period BP are elimination periods during which an image is not displayed in the display area DA.

During the display period DISPLAY, the control part 410 controls the memory 420 and the source driving part 450 to display an image.

For example, the control part 410 reads out a digital data signal stored in the memory 420, and outputs the digital data signal to the source driving part 450. The source driving part 450 converts the digital data signal to an analog data signal, and outputs the analog data signal to the source lines DL1, DL2, ..., DLm. In addition, the control part 410 controls the voltage generating part 430 to apply a common voltage VCOM to the common electrode CE of the display panel 300. The common voltage VCOM may be a direct current voltage having a constant level, or may be a swing voltage that swings in a cycle of one horizontal period (1H). Accordingly, the display panel 300 displays a predetermined image during the display period DISPLAY.

During the elimination periods FP and BP, the control part 410 controls the voltage generating part 430, the pulse generating part 460 and the sampling part 470 to sample coordinates of positions in the display area DA touched by an external object, such as a finger of the user.

For example, the control part 410 controls the voltage generating part 430 not to apply the common voltage VCOM to the common electrode CE. That is, the control part 410 maintains the common electrode CE in a floating state. Any further detailed descriptions on a necessity of the common electrode CE being maintained in the floating state will be omitted hereinafter for brevity since it has been previously explained with reference to FIGS. 2 and 3.

The control part 410 controls the pulse generating part 460 to apply the first and second control pulses PC1 and PC2 to the first and second readout parts 150 and 170. In response to the first and second control pulses PC1 and PC2, the first and second readout parts 150 and 170 output the first detection signals X1, X2, ..., Xi and the second detection signals Y1, Y2, ..., Yj, which are detected through the source lines DL1, DL2, ..., DLm and the gate lines GL1, GL2, ..., GLn, respectively, to the sampling part 470.

According to the control of the control part 410, the sampling part 470 analyzes the first detection signals X1, X2, ..., Xi and the second detection signals Y1, Y2, ..., Yj during the elimination periods FP and BP, and samples coordinates of positions in the display area DA touched by an object. Accordingly, the display panel 300 determines the coordinates of the touched positions during the elimination periods FP and BP.

According to an exemplary embodiment of the present invention, the display panel 300 is operated as a display panel to display an image during the display period DISPLAY, and is operated as a touch detection panel to detect a position that is touched by an object during the elimination periods FP and BP. Therefore, additional readout lines are not necessary, and the source lines DL1, DL2, ..., DLm and the gate lines GL1, GL2, ..., GLn are used as the readout lines, so that aperture ratios may be increased compared to conventional display panels and manufacturing processes thereof may be simplified.

Hereinafter, the same reference numerals will be used to refer to elements that are substantially the same as those previously described and, thus, any further detailed descriptions concerning the same elements will be omitted for brevity.

Figure 8A:
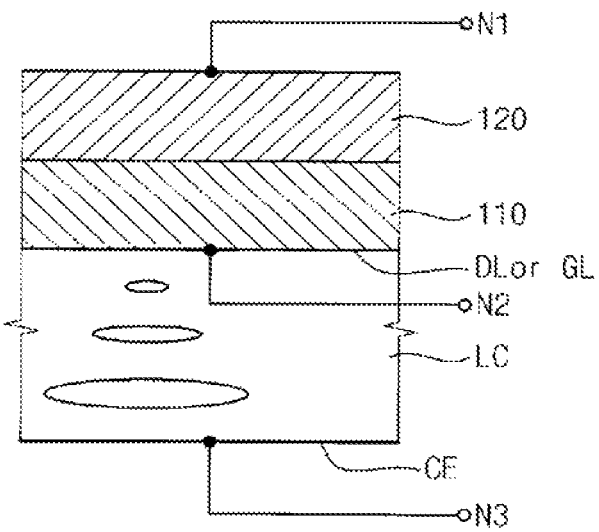
FIG. 8A is a schematic view illustrating the display panel in FIG. 7.
Figure 8B:
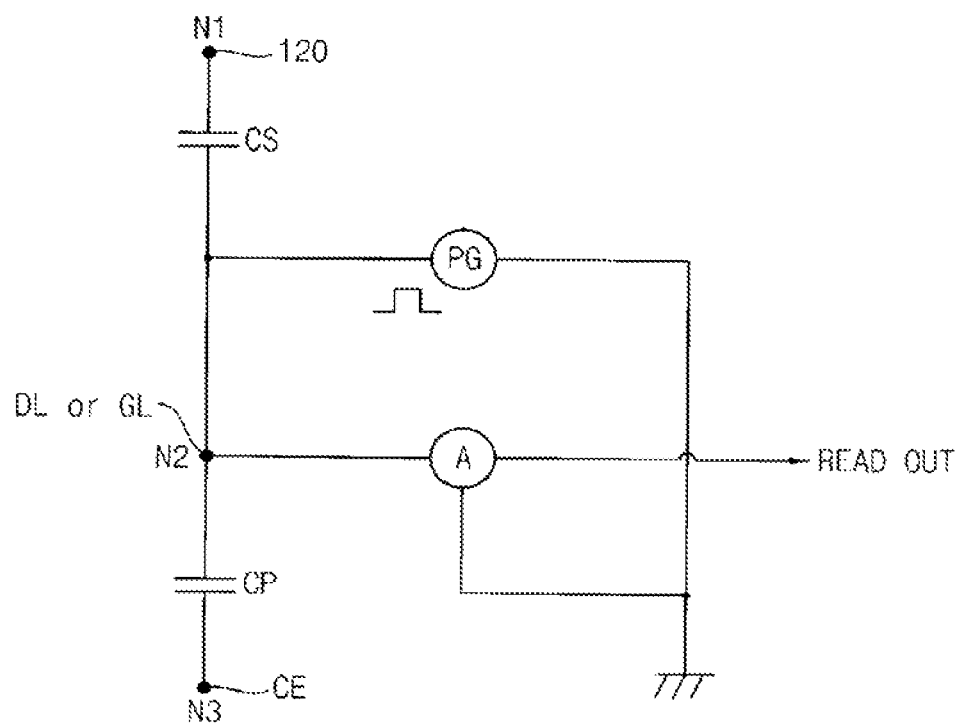
FIG. 8B is an equivalent circuit diagram of the display panel in FIG. 7.

FIG. 7 is a cross-sectional view illustrating a display panel according to an exemplary embodiment of the present invention. FIG. 8A is a schematic view illustrating the display panel in FIG. 7. FIG. 8B is an equivalent circuit diagram of the display panel in FIG. 7.

Referring to FIG. 7, an opposite substrate 200 and an array substrate 100 are disposed at a lower part and at an upper part of the display panel 500, respectively. Light is provided through a rear surface of the opposite substrate 200 of the display panel 500. A front surface of the array substrate 100 is touched by an external object, such as a finger of the user. An equivalent circuit diagram of the display panel 500 is illustrated in FIGS. 8A and 8B.

Referring to FIGS. 8A and 8B, the equivalent circuit diagram of the display panel 500 includes a first node N1, a detecting element CS, a pulse generator PG, a second node N2, a current detector 'A', a parasitic capacitor CP and a third node N3. The first node N1 corresponds to an upper surface of the array substrate 100 to which a first optical film 120 is attached. The upper surface of the array substrate 100 is to be touched by an external object. The second node N2 corresponds to a source line DL (or gate line) that reads out a detection signal. The detecting element CS is formed between the first and second nodes N1 and N2.

The detecting element CS is defined by the first optical film 120, the source line DL (or gate line) and a substance layer, which has a predetermined permittivity, such as a first glass substrate 110, a gate insulating layer, a channel layer, and the like. In this exemplary embodiment, the substrate layer 110 is disposed between the first optical film 120 and the source line DL (or gate line).

The parasitic capacitor CP is formed between the second node N2 and the third node N3. The parasitic capacitor CP is defined by the source line DL (or gate line), a liquid crystal layer LC and a common electrode CE of the opposite substrate 200.

The second node N2 is electrically connected with the pulse generator PG and the current detector 'A'. The current detector 'A' detects a current of the second node N2 in response to a pulse generated from the pulse generator PG. When the pulse generator PG generates a pulse, a constant direct current voltage is applied to the third node N3 and, thus, the current flowing through the parasitic capacitor CP has an invariable value. Accordingly, the current inputted to the current detector 'A' varies corresponding to an electric potential change of the first node N1.

The equivalent circuit of the display panel 500 operates as follows.

When an object does not touch the array substrate 100, the voltage of the first node N1 is a first voltage V1, and a first difference current I1-Ip flows through the current detector 'A'. The first difference current I1-Ip has a value that is a difference between a first current I1 corresponding to a pulse outputted from the pulse generator PG and a parasitic current Ip generated by the parasitic capacitor CP.

On the other hand, when an object touches the array substrate 100, the voltage of the first node N1 is a second voltage V2, and a second difference current I2-Ip flows through the second node N2. The second difference current I2-Ip has a value that is a difference between a second current I2 corresponding to a pulse outputted from the pulse generator PG and a parasitic current Ip generated by the parasitic capacitor CP.

Therefore, a current value of the current flowing through the current detector 'A' corresponds to a difference between the first difference current I1-Ip and the second difference current I2-Ip (hereinafter referred to as "I1-I2-2Ip"). In this case, the parasitic current Ip is an invariable value, and thus the current flowing through the current detector 'A' varies according to the second current I2. The current detector 'A' outputs a detection signal in response to the inputted current.

Figure 9:
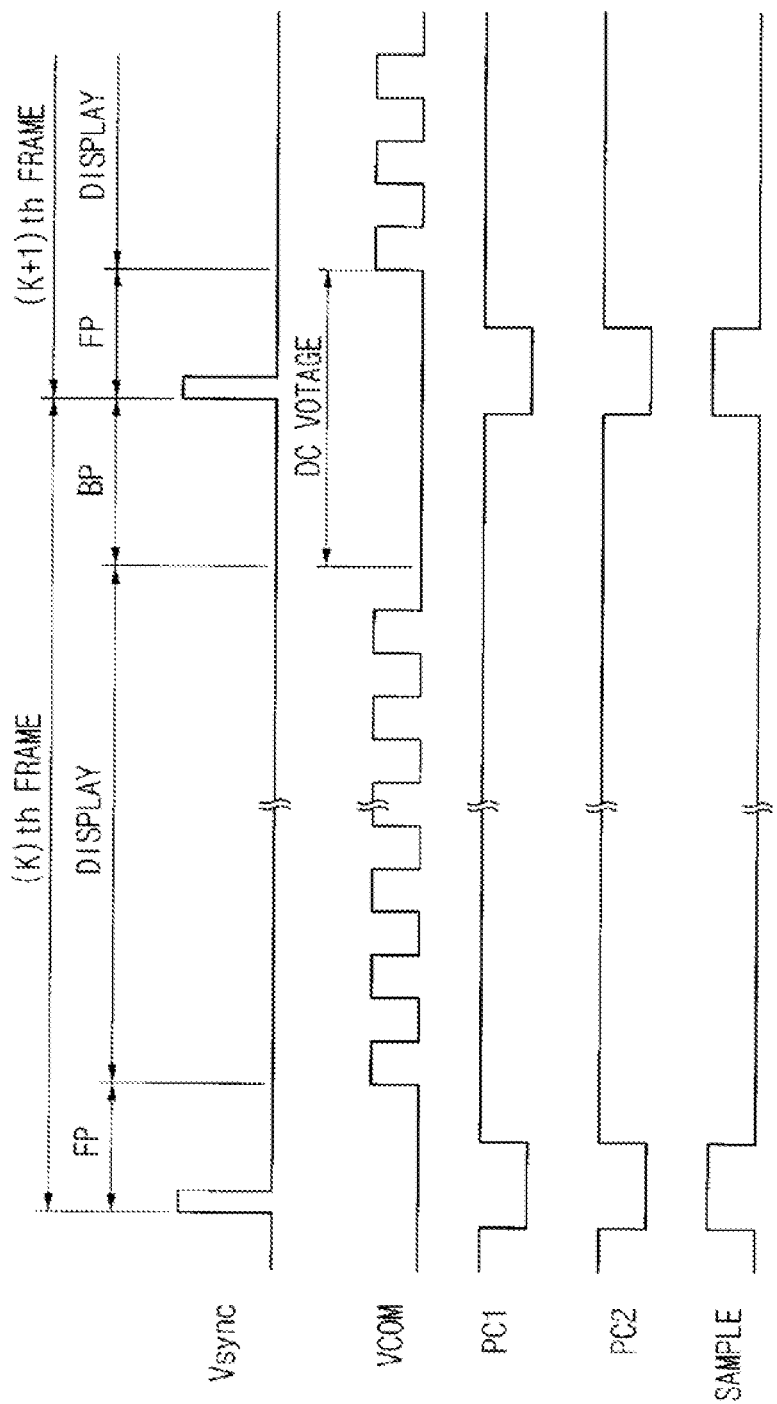
FIG. 9 is a timing diagram for explaining a method of driving the display panel in FIG. 7.

FIG. 9 is a timing diagram for explaining a method of driving the display panel shown in FIG. 7.

Referring to FIGS. 5, 7, 8 and 9, the control part 410 controls the voltage generating part 430, the pulse generating part 460 and the sampling part 470, respectively, on the basis of an externally supplied horizontal synchronization signal Vsync.

During a display period DISPLAY, the control part 410 controls the memory 420 and the source driving part 450 to display an image.

More specifically, the control part 410 reads out a digital data signal stored in the memory 420, and outputs the digital data signal to the source driving part 450. The source driving part 450 converts the digital data signal to an analog data signal, and outputs the analog data signal to the source lines DL1, DL2, . . . , DLm. In addition, the control part 410 controls the voltage generating part 430 to apply a common voltage VCOM to the common electrode CE of the display panel 500. The common voltage VCOM may be a direct current voltage having a constant electric potential, or it may be a swing voltage that swings in a cycle of one horizontal period (1H). Accordingly, the display panel 500 displays a predetermined image during the display period DISPLAY.

During elimination periods FP and BP, the control part 410 controls the voltage generating part 430, the pulse generating part 460 and the sampling part 470 to sample coordinates of positions in the display area DA touched by an object, such as a finger of the user.

For example, the control part 410 controls the voltage generating part 430 to provide the common electrode CE with a direct current voltage having a constant level. Accordingly, the capacitance of the parasitic capacitor CP is constantly maintained, as described above in relation to FIGS. 7, 8A and 8B.

Additionally, the control part 410 controls the pulse generating part 460 to apply the first and second control pulses PC1 and PC2 to the first and second readout parts 150 and 170, respectively. The first and second readout parts 150 and 170 output the first detection signals X1, X2, . . . , Xi and the second detection signals Y1, Y2, . . . , Yj, which are detected through the source lines DL1, DL2, . . . , DLm and the gate lines GL1, GL2, . . . , GLn, respectively, to the sampling part 470 in response to the first and second control pulses PC1 and PC2.

During the elimination periods FP and BP, the sampling part 470 analyzes the first detection signals X1, X2, . . . , Xi and the second detection signals Y1, Y2, . . . , Yj according to the control of the control part 410, and samples coordinates of positions in the display area DA touched by an object such as a finger, as shown by the signal in FIG. 9. Accordingly, the display panel 500 detects the coordinates of the position during the elimination periods FP and BP touched by an object such as a finger.

According to an exemplary embodiment of the present invention, the display panel 500 is operated as a display panel to display an image during the display period DISPLAY, and is operated as a touch detection panel to detect a touch position during the elimination periods FP and BP.

Figure 10:
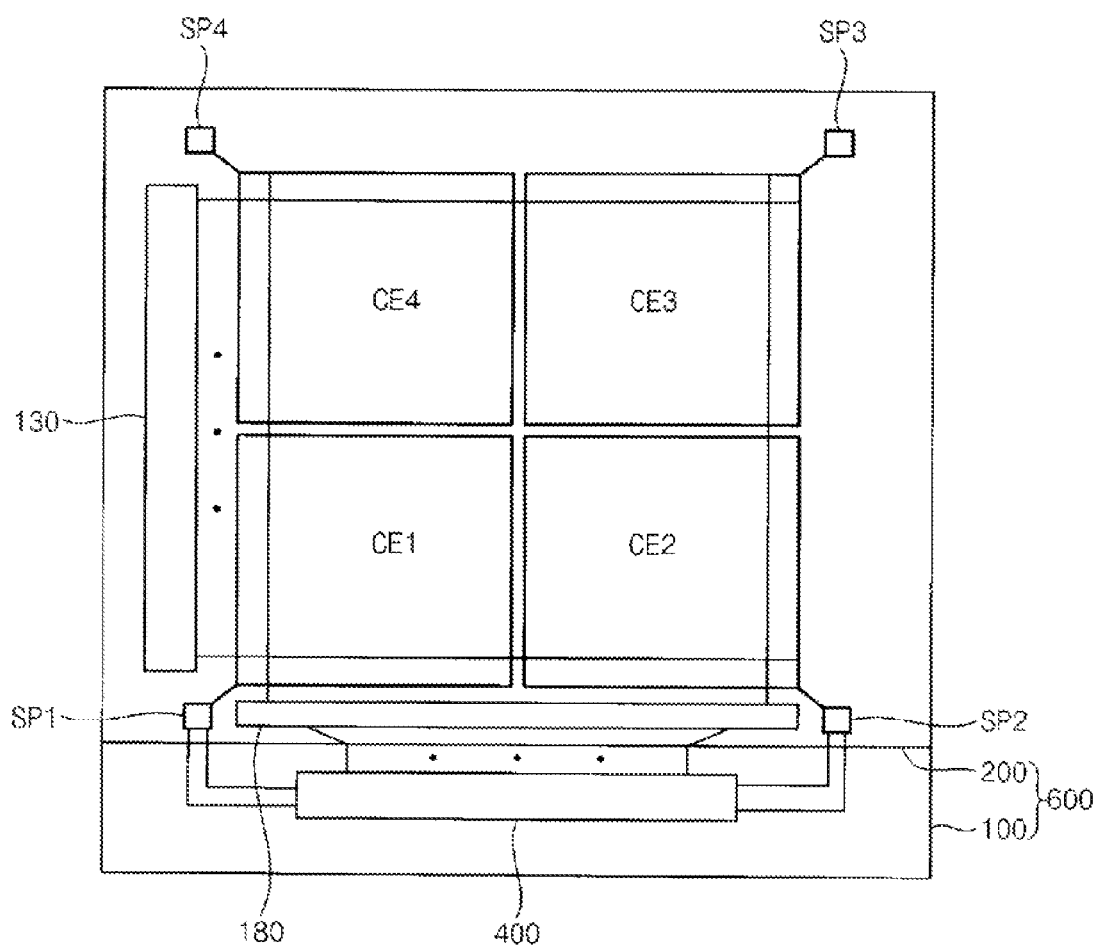
FIG. 10 is a plan view illustrating a display device according to an exemplary embodiment of the present invention.

FIG. 10 is a plan view illustrating a display device according to an exemplary embodiment of the present invention.

Referring to FIG. 10, the display device includes a display panel 600. The display panel 600 includes an array substrate 100, an opposite substrate 200 and a liquid crystal layer (not shown) interposed between the substrates 100 and 200. The array substrate 100 includes a display area DA and a peripheral area PA. The display area DA includes source lines DL1, DL2, . . . , DLm and gate lines GL1, GL2, . . . , GLn (not shown). The source lines DL1, DL2, . . . , DLm and gate lines GL1, GL2, . . . , GLn define a plurality of pixel parts (not shown). Each of the pixel parts includes a switching element (not shown) and a pixel electrode (not shown), which is a first electrode of a storage capacitor (not shown) and a liquid crystal capacitor (not shown). A plurality of short circuit points SP1, SP2, SP3 and SP4 is formed in the peripheral area PA. The short circuit points SP1, SP2, SP3 and SP4 are electrically connected with the opposite substrate 200.

The opposite substrate 200 is combined with the array substrate 100 to receive the liquid crystal layer LC. A common electrode (not shown), which is a second electrode of the liquid crystal capacitor CLC and is opposite to the pixel electrode is formed on the opposite substrate 200. The common electrode is patterned to form a plurality of electrodes CE1, CE2, CE3 and CE4. The electrodes CE1, CE2, CE3 and CE4 are electrically connected with the short circuit points SP1, SP2, SP3 and SP4, respectively.

Figure 11:
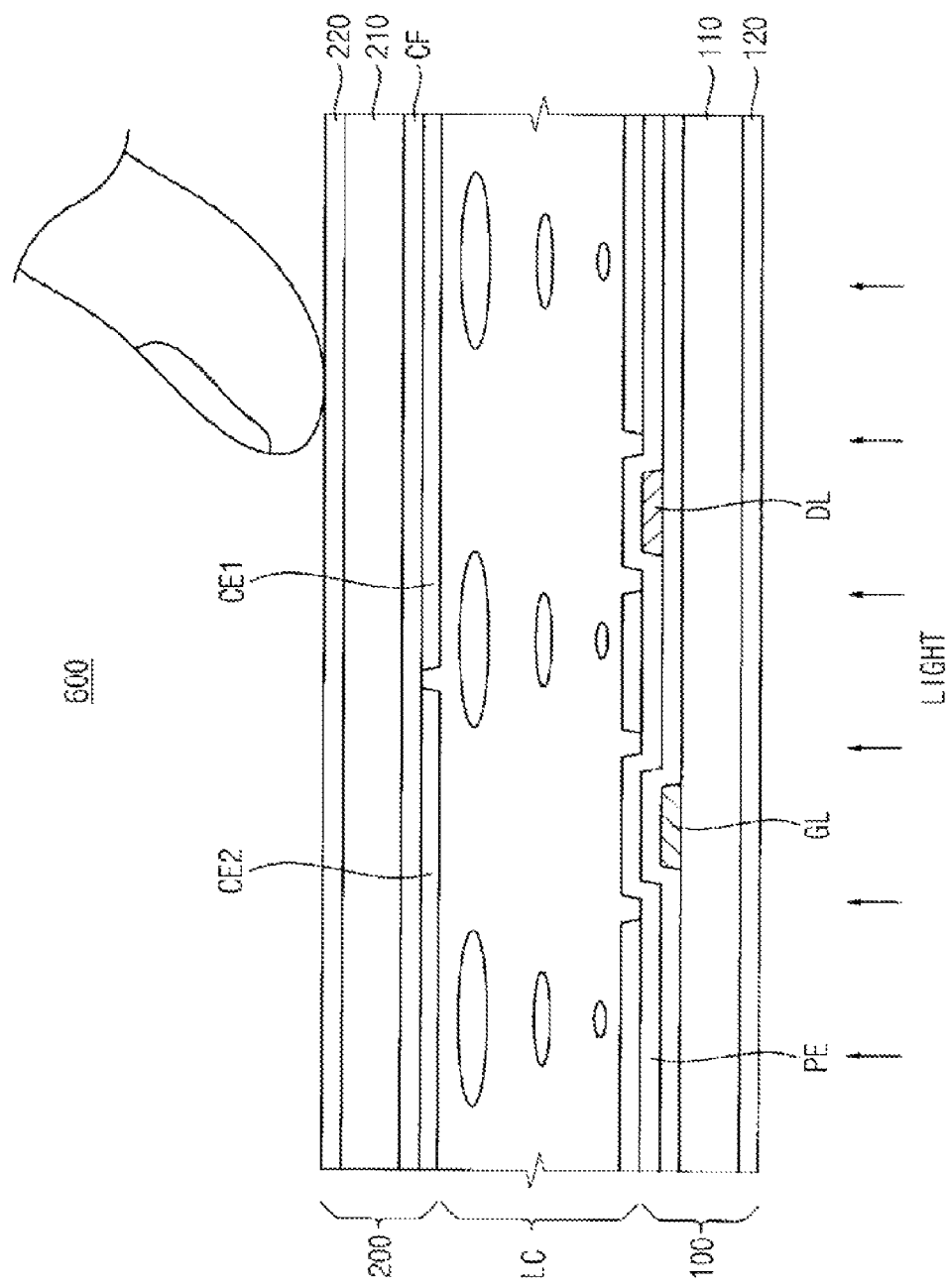
FIG. 11 is a cross-sectional view illustrating the display panel in FIG. 10.
Figure 12A:
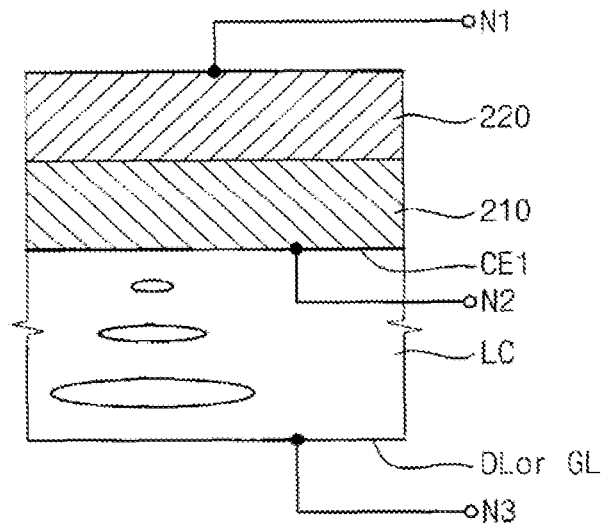
FIG. 12A is a schematic view illustrating the display panel in FIG. 10.

FIG. 11 is a cross-sectional view illustrating the display panel shown in FIG. 10. FIG. 12A is a schematic view illustrating the display panel shown in FIG. 10, and FIG. 12B is an equivalent circuit diagram of the display panel shown in FIG. 10.

Referring to FIGS. 10 and 11, the display panel 600 includes an array substrate 100, an opposite substrate 200, a liquid crystal layer LC, a first optical film 120 that is part of the array substrate and a second optical film 220 that is part of the opposite substrate. The array substrate 100 includes a first glass substrate 110 on which a source line DL, a gate line GL and a pixel electrode PE are formed. The opposite substrate 200 includes a second glass substrate 210 on which a color filter substrate CF and the electrodes CE1, CE2, CE3 and CE4 are formed. The first optical film 120 is attached to the first glass substrate 110, and the second optical firm 220 is attached to the second glass substrate 210.

As shown in FIG. 11, the array substrate 100 and the opposite substrate 200 are disposed at a lower part and an upper part of the display panel 600, respectively. Light is provided through a rear surface of the array substrate 100 of the display panel 600. An upper surface of the opposite substrate 200 is touched by an external object, such as a finger of the user. An equivalent circuit diagram of the display panel 600 is illustrated in FIGS. 12A and 12B.

Figure 12B:
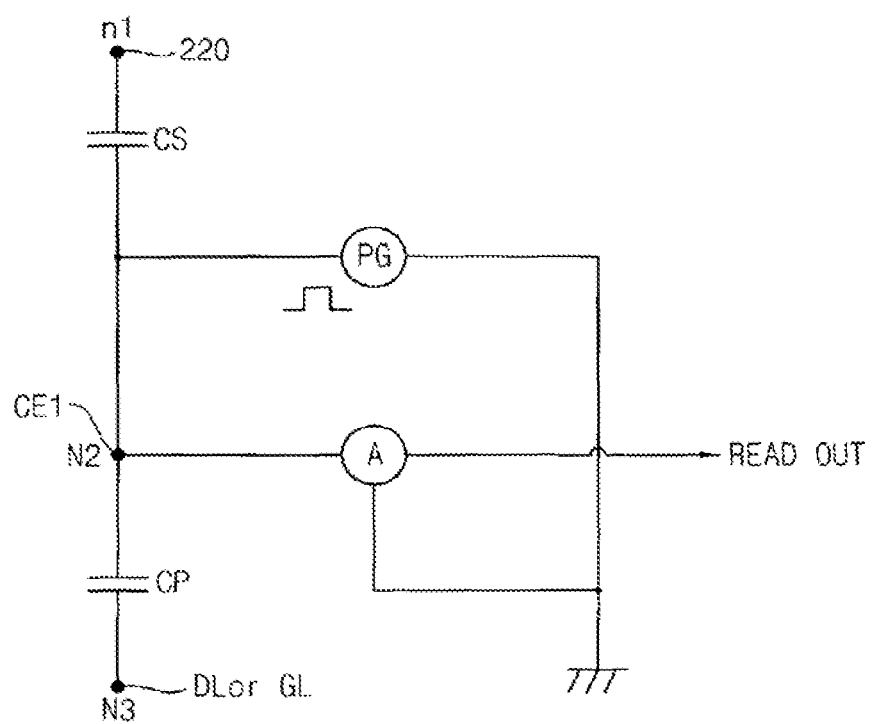
FIG. 12B is an equivalent circuit diagram of the display panel in FIG. 10.

Referring to FIGS. 12A and 12B, the equivalent circuit diagram of the display panel 600 includes a first node N1, a detecting element CS, a pulse generator PG, a second node N2, a current detector 'A', a parasitic capacitor CP and a third node N3. The first node N1 corresponds to the second optical film 220 of the opposite substrate 200 that is touched by an object. The second node N2 corresponds to the electrode, that is, one of electrodes CE1 to CE4 that reads out a detection current generated by the touch of the object. The detecting element CS is formed between the first and second nodes N1 and N2.

The second optical film 220 and the electrode CE1 function as electrodes of the detecting element CS. The detecting element CS is defined by the second optical film 220, the electrode CE1 and a dielectric substance such as the second glass substrate 210, the color filter substrate CF, and the like, which is disposed between the second optical film 220 and the electrode CE1.

The parasitic capacitor CP is formed between the second node N2 and the third node N3. The parasitic capacitor CP is defined by the electrode CE1, the liquid crystal layer LC and the source line DL (or gate line).

The second node N2 is electrically connected to the pulse generator PG and the current detector 'A'. The current detector 'A' detects a current of the second node N2 in response to a pulse generated from the pulse generator PG. When the pulse generator PG generates a pulse, a constant direct current voltage is applied to the third node N3 to keep the capacitance of the parasitic capacitor CP constant, or the third node N3 is maintained in a floating state to eliminate the parasitic capacitor CP so as to prevent the current applied to the current detector 'A' from being varied by the parasitic capacitor CP.

The equivalent circuit of the display panel 600 operates as follows.

When an object does not touch the opposite substrate 200, the voltage of the first node N1 is a first voltage V1, a first current I1 flows through the equivalent circuit by a pulse generated from the pulse generator PG, and the first current I1 is applied to the current detector 'A'. On the other hand, when an object touches the opposite substrate 200, the voltage of the first node N1 is a second voltage V2, and a second current I2 flows through the equivalent circuit in response to a pulse generated from the pulse generator PG. Accordingly, a current I1-I2, which is a difference between the first and second currents I1 and I2, is applied to the current detector 'A'. The current detector 'A' outputs a detection signal in response to the applied current I1-I2.

In this exemplary embodiment, when the third node N3 is the source line DL, a constant direct current voltage is applied to the third node N3, that is, the source line, in order to maintain the capacitance of the parasitic capacitor CP constant. When the third node N3 is the gate line GL, a gate-off voltage VSS is applied to the third node N3, that is, the gate line, to eliminate the parasitic capacitor CP.

Figure 13:
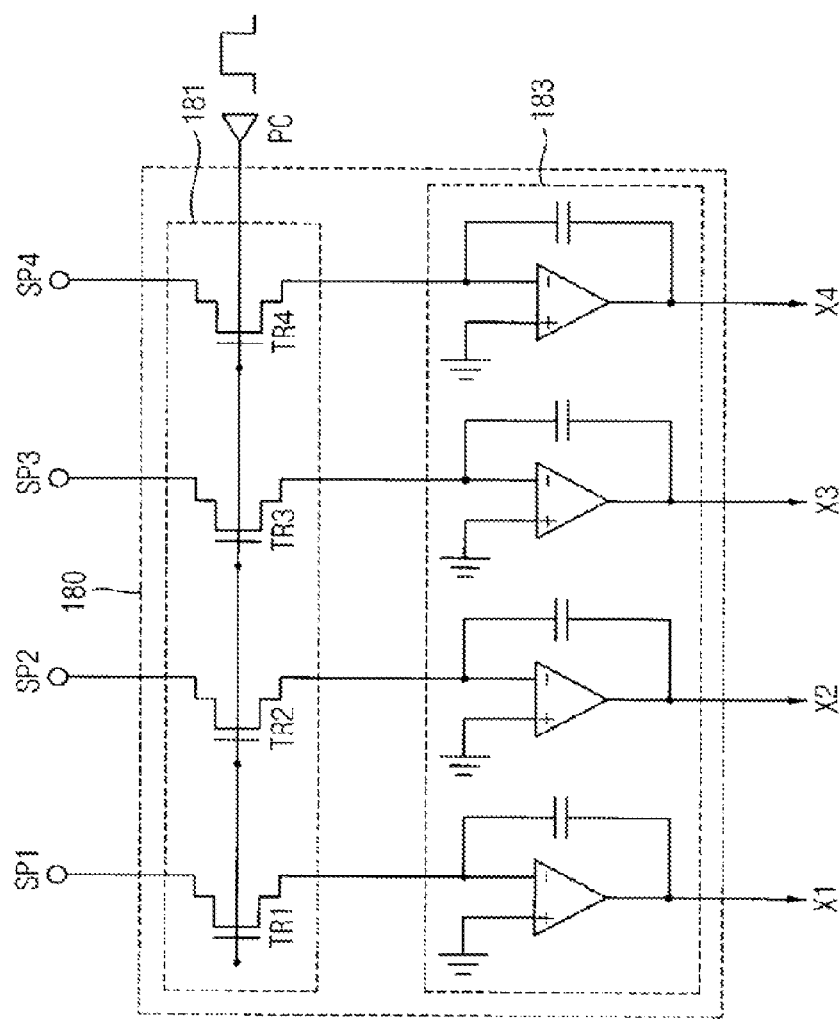
FIG. 13 is a circuit diagram of the readout part of the display device in FIG. 10.

FIG. 13 is a circuit diagram of the readout part 180 of the display device shown in FIG. 10.

Referring to FIG. 13, the readout part 180 includes a switching part 181 and a current detecting part 183. The readout part 180 may be directly integrated on the array substrate 100, or may be mounted as a separate chip. Further, the readout part 180 may be included in the driving part 400 to be embodied as one chip.

The switching part 181 includes transistors TR1, TR2, TR3 and TR4 that are electrically connected with the short circuit points SP1, SP2, SP3 and SP4. Each of the transistors TR1-TR4 includes a gate electrode to which a control pulse PC is applied, a source electrode connected to the short circuit points SP1-SP4, and a drain electrode outputting a respective detection current. When the control pulse PC is applied to the transistors TR1-TR4, the transistors TR1-TR4 output a respective current flowing through the short circuit points SP1-SP4 to the first current detecting part 183.

The current detecting part 183 includes a plurality of op-amps A1, A2, A3 and A4. Each of the op-amps A1 is connected with the drain electrode of a respective transistor TR1-TR4. The op-amps A1-A4 output the detection currents respective flowing through the short circuit points SP1-SP4 as detection signals X1-X4, respectively.

Accordingly, when an object touches the second optical film 220 of the opposite substrate 200, the detection currents flowing through the electrodes CE1, CE2, CE3 and CE4 are applied to the readout part 180 via the short circuit points SP1, SP2, SP3 and SP4, and the readout part 180 outputs the detection currents corresponding to detection signals X1, X2, X3 and X4. Then, the sampling part (not shown) of the driving part 400 samples coordinates of positions touched by an object in accordance with the detection signals X1, X2, X3 and X4.

Figure 14:
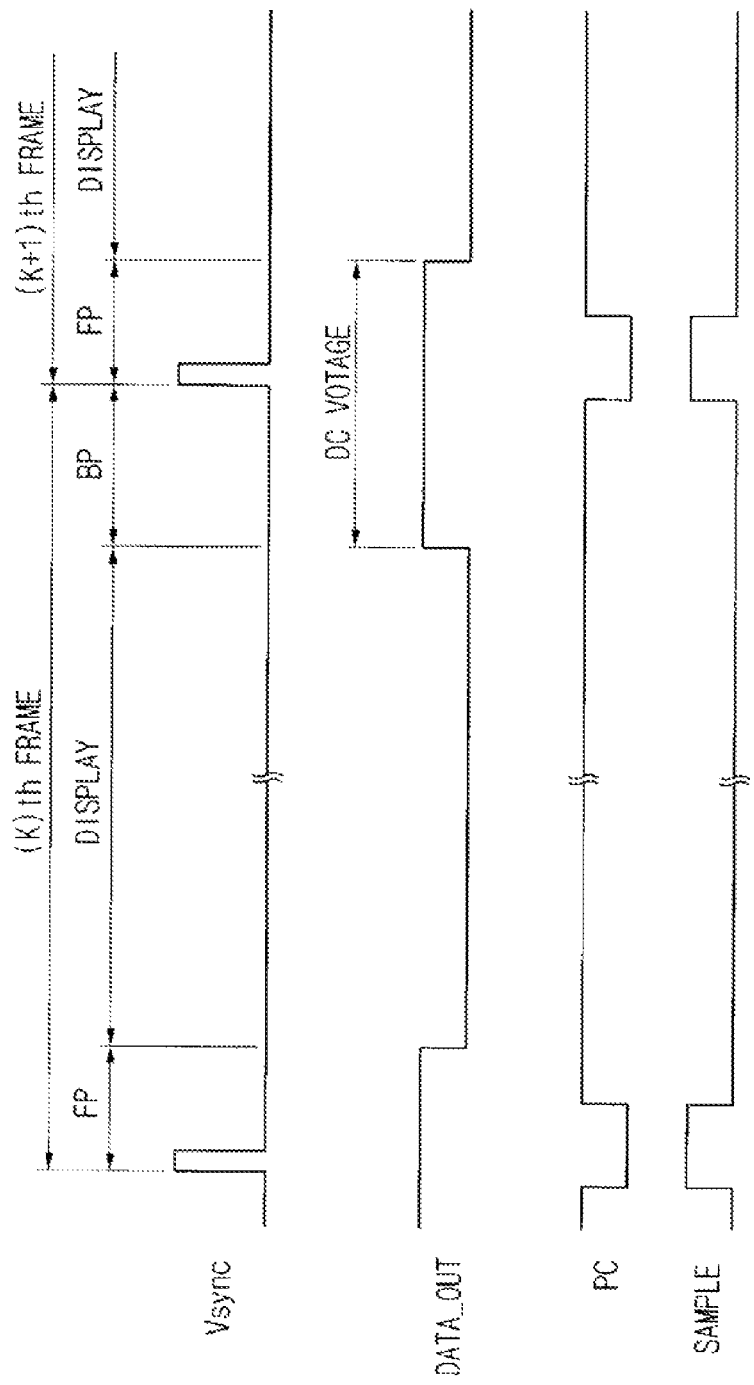
FIG. 14 is a timing diagram for explaining a method of driving the display panel in FIG. 10.

FIG. 14 is a timing diagram for explaining a method of driving the display panel in FIG. 10.

Referring to FIGS. 5, 10, 11, 12, 13 and 14, the control part 410 controls the voltage generating part 430, the pulse generating part 460 and the sampling part 470, respectively, on the basis of an externally supplied horizontal synchronization signal Vsync.

During a display period DISPLAY, the control part 410 controls the memory 420 and the source driving part 450 to output a data signal to the source lines DL1, DL2, . . . , DLm. In addition, the control part 410 controls the gate driving part 130 to output a gate-on voltage VDD to the gate lines GL1, GL2, . . . , GLn. Accordingly, the display panel 600 displays a desired image during the display period DISPLAY.

During elimination periods FP and BP, the control part 410 controls the source driving part 450, the pulse generating part 460 and the sampling part 470 to sample coordinates of positions in the display area DA that are touched by an object such as a finger of the user.

For example, the control part 410 controls the source driving part 450 to provide the source lines DL1, DL2, . . . , DLm with a direct current voltage having a constant level, shown as signal DATA_OUT in FIG. 14. Accordingly, a constant direct current voltage is applied to the third node N3, so that the capacitance of the parasitic capacitor CP is maintained constant during the elimination periods FP and BP.

Further, the control part 410 controls the gate driving part 130 to output a gate-off voltage VSS to the gate lines GL1, GL2, . . . , GLn. Accordingly, the third node N3 is electrically floated, so that the parasitic capacitor CP is eliminated during the elimination periods FP and BP. Generally, a gate-off voltage VSS is applied to the gate lines GL1, GL2, . . . , GLn during the elimination periods FP and BP and, thus, an additional driving system may be unnecessary.

Furthermore, the control part 410 controls the pulse generating part 460 to apply the control pulse PC to the readout part 180 during the elimination periods FP and BP. In response to the control pulse PC, the readout part 180 outputs the detection signals X1, X2, X3 and X4, which are detected from the short circuit points SP1, SP2, SP3 and SP4 electrically connected with the electrodes CE1, CE2, CE3 and CE4, respectively, to the sampling part 470.

The sampling part 470 analyzes the detection signals X1, X2, X3 and X4 according to the control capacity of the control part 410 during the elimination periods FP and BP, and samples coordinates of positions touched by an object such as a finger in the display area DA by means of the sample signal SAMPLE.

In order to detect a touch position in the display device more precisely, according to an exemplary embodiment of the present invention, the number of patterned electrodes may be increased, and the number of the short circuit points connected with the patterned electrodes may be correspondingly increased.

According to the exemplary embodiment of the present invention described above, a detection signal is read out through source and gate lines that are formed on a display array substrate, so that an aperture ratio may be increased, and a manufacturing process thereof may be simplified. For example, the exemplary embodiment of the present invention includes a readout part electrically connected with source and gate lines. The readout part is controlled to read out a detection signal from the source and gate lines during an elimination period. Further, a driving signal is applied to the source and gate lines during a display period to display an image.

In addition, according to the exemplary embodiment of the present invention, a detection signal is read out through a common electrode formed on an opposite substrate, so that an aperture ratio may be increased, and a manufacturing process thereof may be simplified. For example, the exemplary embodiment of the present invention includes a readout part electrically connected with a plurality of electrodes corresponding to the common electrode. The readout part is controlled to read out a detection signal from the common electrode.

Therefore, additional lines for reading out a detection signal are not necessary to display an image and also to detect a touched position.

Although exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display device comprising:
   a display panel including an array substrate on which a source line and a gate line are formed and an opposite substrate on which a common electrode is formed;
   a source driving part outputting a data signal to the source line during a display period of a frame period;
   a gate driving part outputting a gate signal to the gate line during the display period;
   a readout part reading out a detection signal during an elimination period of the frame period, the readout part being electrically connected with at least one of the lines of the array substrate and the common electrode of the opposite substrate, wherein the elimination period is separate from the display period; and
   a pulse generating part outputting a control pulse for operating the readout part during the elimination period,
   wherein a first parasitic capacitor is connected between the common electrode and the source line,
   wherein a second parasitic capacitor is connected between the common electrode and the gate line,
   wherein, during the elimination period, a constant direct current voltage is applied to the first parasitic capacitor, via the common electrode, to maintain the capacitance of the parasitic capacitor constant, and a gate-off voltage is applied to the second parasitic capacitor, via the gate line, to eliminate the parasitic capacitor, and
   wherein, during the display period, a swing voltage is applied to the common electrode.

2. The display device of claim 1, wherein the array substrate further comprises a short circuit point electrically connected with the common electrode, and the readout part reads out the detection signal from the short circuit point.

3. The display device of claim 2, wherein the common electrode comprises a plurality of patterned electrodes, and the readout part reads out the detection signal from a plurality of short circuit points electrically connected with the plurality of patterned electrodes.

4. The display device of claim 2, wherein the source driving part outputs a direct current voltage to the source lines during the elimination period.

5. A method of driving a display device including an array substrate on which a source line and a gate line are formed and an opposite substrate on which a common electrode is formed, comprising;
   displaying an image at the display device by outputting a driving signal to the source and gate lines during a display period of a frame period; and
   reading out a defection signal detected at the display device from at least one of the lines of the array substrate and the common electrode of the opposite substrate during an elimination period of the frame period,
   wherein the elimination period is separate from the display period,
   wherein a first parasitic capacitor is connected between the common electrode and the source line,
   wherein a second parasitic capacitor is connected between the common electrode and the gate line,
   wherein, during the elimination period, a constant direct current voltage is applied to the first parasitic capacitor, via the common electrode, to maintain the capacitance of the parasitic capacitor constant, and a gate-off voltage is applied to the second parasitic capacitor, via the gate line, to eliminate the parasitic capacitor, and
   wherein, during the display period, a swing voltage is applied to the common electrode.

6. The method of claim 5, wherein reading out the detection signal includes reading out the detection signal from a short circuit point electrically connected with the common electrode.

7. The method of claim 6, wherein reading out the detection signal further comprises outputting a direct current voltage to the source line during the elimination period when light is incident onto a bottom surface of the array substrate.

* * * * *